United States Patent [19]

Huang

[11] Patent Number: 4,714,230

[45] Date of Patent: Dec. 22, 1987

[54] CONVERTIBLE SUSPENSION MOUNTING SYSTEM FOR CEILING FANS

[75] Inventor: Ming-Chien Huang, Taichung Hsien, Taiwan

[73] Assignee: St. Island Intl. Patent & Trademark Office, Taipei, Taiwan

[21] Appl. No.: 781,914

[22] Filed: Sep. 30, 1985

[51] Int. Cl.⁴ .............................................. B42F 13/00
[52] U.S. Cl. .................................... 248/613; 248/343; 362/390
[58] Field of Search ........................ 248/613, 342–345; 362/390, 404

[56] References Cited

U.S. PATENT DOCUMENTS

| | | | |
|---|---|---|---|
| 1,004,137 | 9/1911 | Benjamin | 298/613 |
| 1,006,232 | 10/1911 | Kraushaar | 362/390 |
| 1,270,296 | 6/1918 | Jeune | 248/343 |
| 1,350,056 | 8/1920 | Barry | 362/390 |
| 1,555,821 | 10/1925 | Benjamin | 248/613 |
| 1,555,822 | 10/1925 | Benjamin | 248/613 |
| 1,686,362 | 10/1928 | Arras | 362/404 |
| 2,347,113 | 4/1944 | King | 362/404 |
| 2,467,639 | 4/1949 | Tornblom | 248/343 |
| 2,477,911 | 8/1949 | Travis | 248/343 |
| 3,621,235 | 11/1971 | Appleton | 362/390 |

FOREIGN PATENT DOCUMENTS

| | | | |
|---|---|---|---|
| 327178 | 8/1919 | Fed. Rep. of Germany | 362/390 |
| 580941 | 7/1933 | Fed. Rep. of Germany | 362/390 |
| 27948 | of 1909 | United Kingdom | 362/390 |

*Primary Examiner*—Ramon O. Ramirez
*Assistant Examiner*—Robert A. Olson
*Attorney, Agent, or Firm*—Charles E. Pfund

[57] ABSTRACT

A convertible suspension mounting system for ceiling fans having a disk-shaped fixing support for being secured on the ceiling surface, a housing body of a bowl shape connected to the fixing support, a connecting device flexibly coupled with the housing body at one end and screw-connected to a pipe fitting of a ceiling fan structure. The connecting device includes a tubular connecting member with screw threads and a through hole respectively formed at each end, a circular coupling member screw-connected to the connecting member at the upper portion, and an axially flexible pipe sleeve fastened between the circular coupling member and the bottom side of the housing body with the upper portion of the connecting member flexibly received therein, so that the connecting member is provided with an axial deviation for adapting to various ceiling surface conditions, and the suspension system can be conveniently converted into a direct coupling system without the connecting device.

1 Claim, 5 Drawing Figures

CONVERTIBLE SUSPENSION MOUNTING SYSTEM FOR CEILING FANS

BACKGROUND OF THE INVENTION

This invention relates to a suspension mounting system for ceiling fans, particularly to the type that can be converted into a direct coupling arrangement without requiring additional elements.

Conventionally, mounting systems for ceiling fans are classified generally into two types—a bar suspension type as shown in FIG. 1, and a direct coupling type as shown in FIG. 2. Owing to the different configurations of elements, these two types of mounting system are different in structure and shape. The bar suspension type, for example, usually includes a housing body 2 fixed on the ceiling surface, and a connecting pipe 1 coupled between the housing body 2 and the ceiling fan structure. Whereas, in the direct coupling type the ceiling fan structure 3' is directly connected to the housing body 4 which has a larger disk area 41 than does the housing body 2 of the bar suspension type secured on the ceiling surface. In addition to the major differences as noted above, some other elements of these two mounting systems vary also. Therefore, these two systems are certainly not compatible with each other, and the structural elements have to be separately manufactured, not only requiring different manufacturing facilities but also incurring increased costs. Moreover, it is inconvenient for the costumers to have to choose the one suitable for their house conditions. Additionally, the bar suspension system suffers a structural problem. As shown in FIG. 1, the positioning arrangement between the connecting pipe 1 and the housing body 2 is usually made by means of a semi-spherical member 1A engaged in a central opening 2A of the housing body 2. Therefore, the semi-spherical member 1A should be rigid enough not to slip down and eventually come off of the housing body. However, since manufacturing costs are a concern, the semi-spherical member 1A is always made of plastic material through an injection moulding operation. As a result, the safety consideration is also a problem.

SUMMARY OF THE INVENTION

It is accordingly a primary object of this invention to provide a convertible suspension mounting system for ceiling fans that overcomes the foregoing problems associated with the prior art.

With the above and other objects in mind, the present invention provides a convertible suspension mounting system which comprises: a fixing support having a specified disk area secured on the ceiling surface of a building; a housing body with a central opening in the lower part coupled with the fixing support; a connecting member having a threaded portion at each end connected to the fixing support at the upper end through the central opening of the housing body; and a ceiling fan structure with a threaded pipe fitting on the top surface screw-connected to the lower end of the connecting member.

The present invention resides in the structural arrangement of the connecting member, which has a circular coupling member screw-connected at the upper portion, and an axially flexible tube sleeve circumferentially fastened on the periphery area of the circular coupling member at one end with the other end being connected to the central opening of the housing body so that a bar suspension mounting system is effected therewith.

In a specific alternative, the present invention further resides in the structural arrangement of the fixing support and housing body, because both can be directly combined and connected by the ceiling fan structure without the connecting member so as to effect a direct coupling mounting system.

These and other objects and characteristics of the present invention will become clear from the following descriptions of a preferred embodiment when read in conjunction with the accompanying drawings.

DETAILED DESCRIPTION OF THE PREFERRED EMBODIMENT

Figure 1:
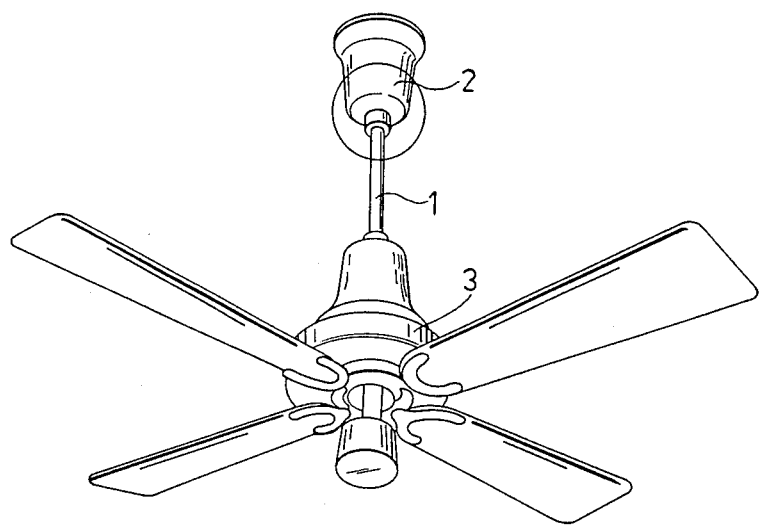
FIG. 1 is a structural illustration of a known bar-suspension type of the ceiling fan.
Figure 1:
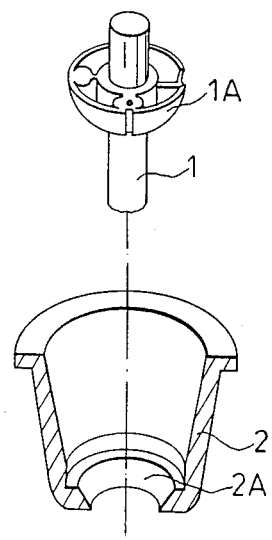
Figure 2:
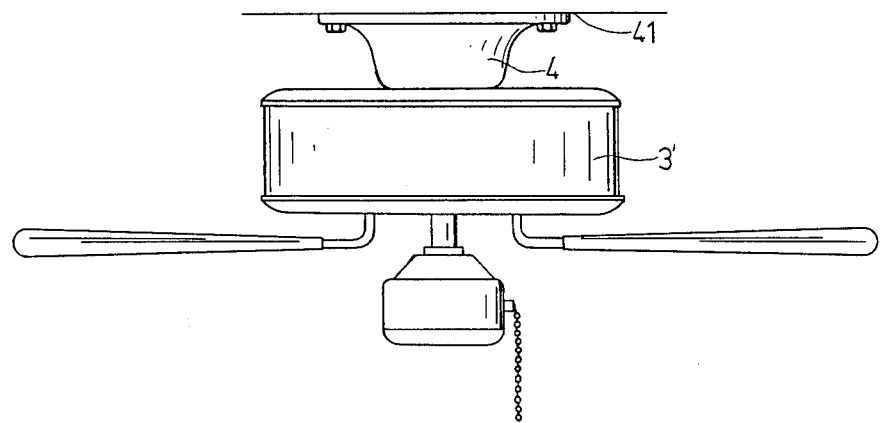
FIG. 2 is a structural illustration of a known direct coupling type of the ceiling fan.
Figure 3:
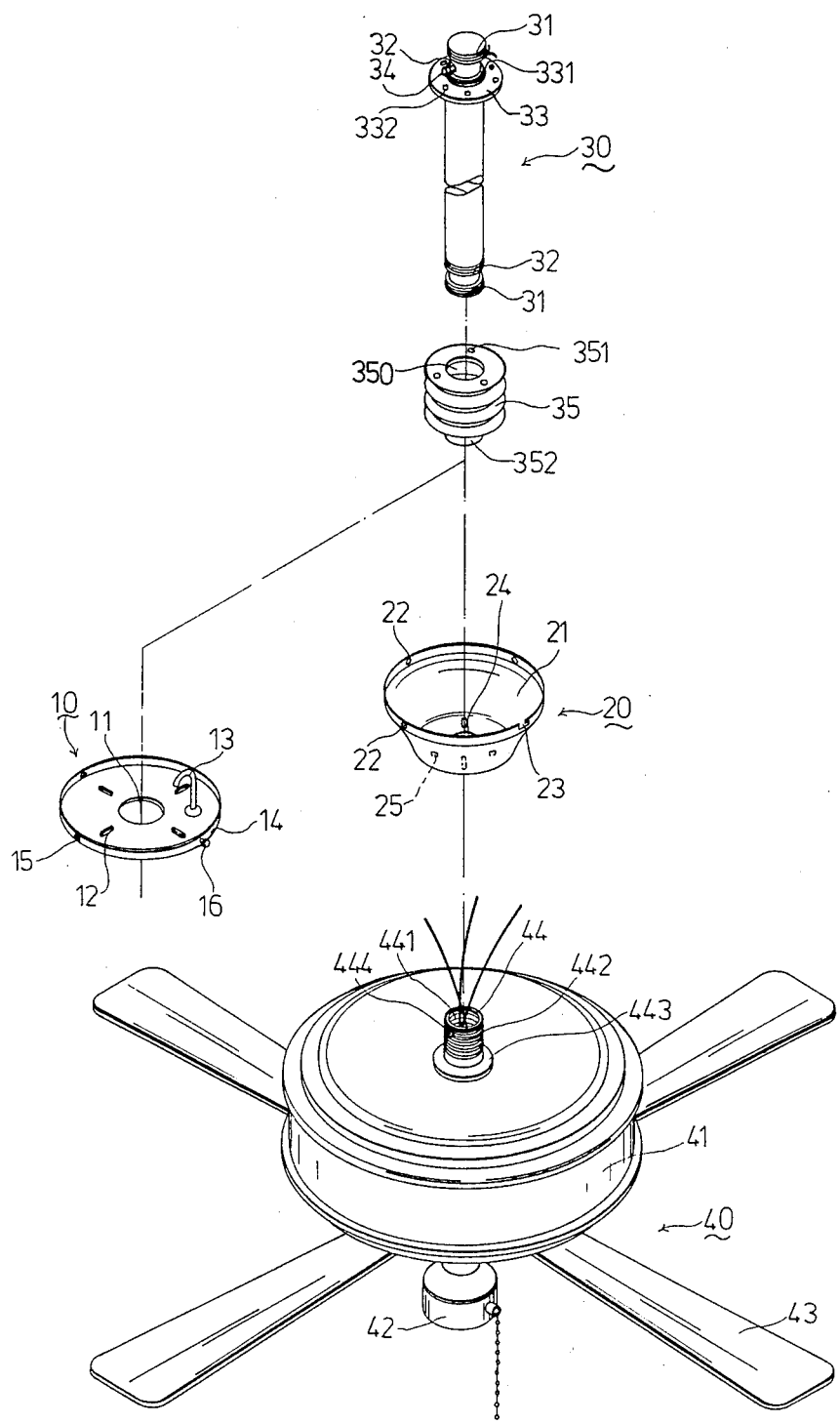
FIG. 3 is a perspective and exploded view of a preferred embodiment of a convertible suspension mounting system for ceiling fans according to this invention.

Referring to FIG. 3, the preferred embodiment of a convertible suspension mounting system for ceiling fans according to this invention comprises in combination a fixing support 10, a housing body 20, a connecting member 30 and a ceiling fan structure 40.

The fixing support 10 formed in a disk conformation includes: an opening 11 in the center; a plurality of threaded orifices 12 symmetrically provided around the opening 11 for use in fastening the fixing support 10 with screws on a solid surface such as on the ceiling of a building; a hook member 13 vertically disposed beside the opening 11 for facilitating the temporary hook up of wire lines during the installation of the ceiling fan structure; and an annular flange 14 with a plurality of apertures 15 and a lug 16 evenly located therein for making connections with the housing body 20.

The housing body 20 is formed in a bowl shape having an accommodating space 21 defined in the middle with the diameter of its circumferential rim slightly larger than that of the annular flange 14 of the fixing support 10, a plurality of round holes 22 and an L-shaped notch 23 evenly located in the rim edge, corresponding respective-to the locations of the apertures 15 and the lug 16 of the fixing support 10, an annular opening 24 formed in the bottom side, and a plurality of screw holes 25 provided in the bottom surface around the opening 24.

With a tubular structure, the connecting member 30 comprises: a threaded portion 31 and a through hole 32 formed at each end; a circular coupling member 33, whose diameter is larger than that of the central opening 24 of the housing body 20, having an axial screw opening 331 provided in the center and a plurality of screw holes 332 evenly located in the side surface, being screw-connected to the connecting member 30 at the upper portion thereof; a stop pin 34 disposed in the upper through hole 32 for preventing the circular coupling member 33 from slipping beyond itself; and an axially flexible pipe sleeve 35, which is made of shock-absorbing material and provided with a through opening 350, whose diameter is larger than that of the connecting member 30 and smaller than that of the circular member 33, a reinforced portion at the top and the bottom areas with a plurality of screw holes 351 symmetrically located therein, and a tubular neck portion 352 formed at the lower end with its diameter larger than that of the through opening 350 and smaller than that of the annular opening 24 of the housing body 20, connected between the coupling disk 33 through the screw holes 332 and the bottom surface of the housing body 20 through the screw holes 25 with the tubular neck portion 352 extending downward below the bottom side of the housing body 20. The existing power lines are inserted into the connecting member 30 from the central opening 11 of the fixing support 10 and are led out from the mouth of the neck portion 352 for making electrical connections with the wire lines of the ceiling fan structure 40.

The ceiling fan structure 40 includes, as usual, a motor housing 41 used for receiving a driving motor therein, a control switch 42 connected to the lower portion of the housing 41 for adjusting the revolution speed of the ceiling fan, and a plurality of fan blades 43 fixed on the bottom side of the housing 41. On top of the motor housing 41 is a pipe fitting 44 having screw threads formed inside and outside, a pin hole 444 in the upper portion, and a rubber washer 443 disposed at the lower portion, being vertically located at the center with the wire lines of the driving motor and the control switch 42 assembled there for making connection with the mounting system of this invention.

With the combination of the elements as illustrated and described hereinbefore, the preferred embodiment of this invention can be assembled either as a bar suspension system or as a direct coupling system as the situation dictates or as the user prefers.

Figure 4A:
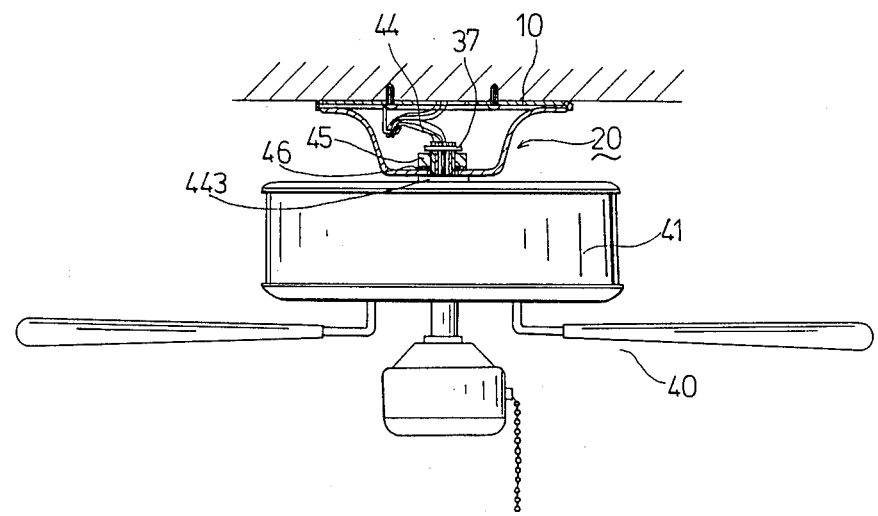
FIG. 4 (A, B) is an assembled illustration of the preferred embodiment, respectively showing the different combination types of this invention.

For the direct coupling assembly, please refer to FIG.'S 3 and 4A. The fixing support 10 is, firstly, fastened with screws on the ceiling surface of the building through the orifices 12, with the existing power lines being placed within the central opening 11; next, the housing body 20 is connected to the pipe fitting 44 and secured thereat by a nut 45 and a washer 46 against the rubber washer 443, a pin 37 is disposed in the pin hole 444 to prevent the nut 45 from getting loose, the wire lines in the pipe fitting 44 are electrically connected to the existing power lines located in the central opening 11 of the fixing support 10, and, finally, the housing body 20, together with the ceiling fan 40, is connected to the fixing support 10 by engaging the L-shaped notch 23 of the housing body 20 with the lug 16 of the fixing support 10 and then fastening them together with screws through the apertures 15 and the round holes 22, with the slackened portion of the wire lines hooked up on the hook 13 of the fixing support 10, accomplishing the direct coupling system as shown in FIG. 4A.

Figure 4B:
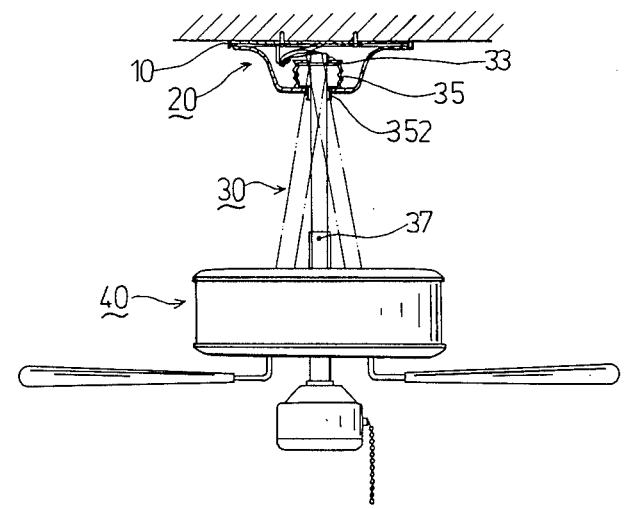

As illustrated in FIG. 3 and described hereinbefore, the assembly of the bar suspension system according to this invention is as shown in FIG. 4B wherein the wire lines in the pipe fitting 44 are electrically connected to the power lines first, and then, the pipe fitting 44 is screw-connected to the lower end 31 of the connecting member 30 through the screw threads 441 and secured by the pin 37 in the pin hole 444, accomplishing a bar suspension system as shown in FIG. 4B.

It shall be appreciated that, owing to the flexibility of the pipe sleeve 35, the connecting member 30 coupled with the pipe sleeve 35 is permitted to have sufficient axial deviation so as to be adaptable to various ceiling conditions and is always kept perpendicular to the ground level of the building during rotation. Moreover, the torsional vibration produced by the ceiling fan 40 during its rotation can also be relieved by the pipe sleeve 35 through its buffer action; therefor, this arrangement is more stable and steady than that of the prior art.

The invention may be embodied in other specific forms without departing from the spirit or essential characteristics thereof. The present embodiment is, therefore, to be considered in all respects as illustrative and not restrictive, the scope of the invention being limited by the appended claims rather than by the foregoing description, and all changes which cause within the meaning and range of equivalency of the claims are, therefore, intended to be embraced therein.

What I claim is:

1. A convertible suspension mounting system for use with a ceiling fan which utilizes a support structure comprising a disk member having a central opening and a plurality of threaded orifices provided therein for being fastened to a ceiling surface and a housing body having an annular opening and screw holes in its bottom side and a plurality of round holes in its upper periphery connected to the disk member through the threaded orifices, the ceiling fan having a threaded pipe fitting provided on top thereof for effecting connection with the support structure, said mounting system operations comprising:

a tubular connecting member having a threaded portion and a through hole respectively provided at its upper and lower portions for being vertically received at its upper portion in the annular opening of the housing body and for permitting connection at its lower portion to the threaded pipe fitting of the ceiling fan;

a circular coupling member, whose diameter is larger than that of the annular opening of the housing body, having an axial opening in its center, with a diameter larger than that of the connecting member, and a plurality of screw holes located in its side surface, said coupling member being connected to the upper portion of said connecting member through the axial opening;

a stop element fixed in the through hole at the upper portion of said connecting member over said circular coupling member to secure the latter in position; and an axially flexible pipe sleeve of shock absorbing material having a through opening with a diameter larger than that of the connecting member and smaller than that of said circular coupling member positioned around the upper portion of said connecting member between said circular coupling member and the bottom side of the housing body, a reinforced portion formed at the top and bottom areas of said sleeve;

a plurality of screw holes symmetrically located therein for permitting connection with said circular coupling member and the bottom side around the annular opening of the housing body; and a tubular neck portion formed around its lower end with a diameter larger than that of the through opening and smaller than that of the annular opening of the housing body for movably receiving the upper portion of said connecting member therein, said connecting member thereby being provided with sufficient axial deviation so as always to be kept perpendicular to the ground level of a building in which the ceiling fan is mounted under various ceilng conditions.

* * * * *

UNITED STATES PATENT AND TRADEMARK OFFICE
CERTIFICATE OF CORRECTION

PATENT NO. : 4,714,230

DATED : December 22, 1987

INVENTOR(S) : Ming-Chien HUANG

It is certified that error appears in the above—identified patent and that said Letters Patent is hereby corrected as shown below:

In the legend, delete "[73] Assignee: St. Island Intl. Patent & Trademark Office"

Signed and Sealed this

Sixteenth Day of August, 1988

*Attest:*

DONALD J. QUIGG

*Attesting Officer*

*Commissioner of Patents and Trademarks*